United States Patent
Grewal et al.

(10) Patent No.: US 11,097,727 B2
(45) Date of Patent: Aug. 24, 2021

(54) ECO-CRUISE: TORQUE MANAGEMENT

(71) Applicant: GM Global Technology Operations LLC, Detroit, MI (US)

(72) Inventors: Amanpal S. Grewal, Novi, MI (US); Matthew S. Zebiak, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 354 days.

(21) Appl. No.: 16/298,042

(22) Filed: Mar. 11, 2019

(65) Prior Publication Data
US 2020/0290610 A1    Sep. 17, 2020

(51) Int. Cl.
*B60W 30/14*    (2006.01)

(52) U.S. Cl.
CPC ........ *B60W 30/143* (2013.01); *B60W 30/146* (2013.01); *B60W 2520/10* (2013.01); *B60W 2520/105* (2013.01); *B60W 2710/0666* (2013.01); *B60W 2710/083* (2013.01); *B60W 2720/10* (2013.01)

(58) Field of Classification Search
CPC ............ B60W 30/143; B60W 30/146; B60W 2520/10; B60W 2520/105; B60W 2720/10; B60W 2710/0666; B60W 2710/083
See application file for complete search history.

(56) References Cited

U.S. PATENT DOCUMENTS

| | | | |
|---|---|---|---|
| 4,858,135 A * | 8/1989 | Clish | G07C 5/12 701/93 |
| 5,454,442 A | 10/1995 | Labuhn et al. | |
| 6,138,071 A * | 10/2000 | Sekine | B60K 31/042 180/170 |
| 6,470,256 B1 | 10/2002 | Cikalo et al. | |
| 8,332,118 B2 * | 12/2012 | Niwa | B60W 50/0098 701/70 |
| 9,573,595 B2 * | 2/2017 | Fairgrieve | B60W 30/18172 |
| 10,328,938 B2 * | 6/2019 | Schubert | G08G 1/0133 |
| 10,392,001 B2 * | 8/2019 | Gaither | B60W 20/11 |
| 2003/0182046 A1 * | 9/2003 | Nada | B60W 10/10 701/93 |
| 2004/0084237 A1 | 5/2004 | Petrie, Jr. | |
| 2013/0226420 A1 * | 8/2013 | Pedlar | B60W 10/06 701/67 |

(Continued)

*Primary Examiner* — Dale W Hilgendorf
(74) *Attorney, Agent, or Firm* — Quinn IP Law

(57) ABSTRACT

A cruise control method to control a vehicle includes: receiving, by a controller of the vehicle, a set speed, a maximum allowed speed, and a minimum allowed speed, wherein each of the maximum allowed speed and the minimum allowed speed is a speed boundary; a propulsion system to produce a commanded axle torque to maintain the set speed; monitoring a current vehicle speed of the vehicle; determining a current vehicle acceleration of the vehicle; determining a time that the vehicle will take to reach the speed boundary; determining whether the time that the vehicle will take to reach the speed boundary is less than a predetermined time threshold; and in response to determining that the time that the vehicle will take to reach the speed boundary is less than the predetermined time threshold, commanding the propulsion system of the vehicle to adjust the commanded axle torque.

20 Claims, 3 Drawing Sheets

(56) References Cited

U.S. PATENT DOCUMENTS

| | | | |
|---|---|---|---|
| 2013/0261889 A1* | 10/2013 | Sekine | B60W 50/085 701/36 |
| 2014/0046523 A1* | 2/2014 | Lado | B60W 30/1882 701/22 |
| 2016/0264138 A1* | 9/2016 | Jung | B60W 30/025 |
| 2016/0297435 A1* | 10/2016 | D'Amato | B60W 50/0097 |
| 2017/0158194 A1* | 6/2017 | Leisenring | F01N 3/025 |
| 2018/0170381 A1* | 6/2018 | Kamatani | B60W 10/06 |
| 2019/0308640 A1* | 10/2019 | Miller | F02P 5/045 |

* cited by examiner

ECO-CRUISE: TORQUE MANAGEMENT

The present disclosure relates to a method and system to control a cruise control of a vehicle to optimize fuel economy.

Cruise control is currently calibrated to rigidly control a driver's set speed, and can be aggressive and inefficient in its attempt to maintain that speed on changes in road grades. This leads to lower fuel economy and unnatural behavior (e.g., aggressive tip-ins and downshifts while going up hills, riding the brakes down hills, etc.).

SUMMARY

The present disclosure describes a method and system to control a cruise control of a vehicle to optimize fuel economy. By doing so, the presently disclosed method allows for intelligent torque modulation within allowed speed bandwidth to reduce speed fluctuations while maximizing efficient operation. The presently disclosed method is configured to allow a vehicle speed deviation relative to a driver requested set speed. Sometimes, a constant road load torque is applied as the vehicle traverses varying grades. This method, however, allows torque output to react slightly while still delivering improvements in fuel economy. Doing so allows for an improvement in speed control and increased tolerance to road elevation changes. Torque is commanded in various stages depending upon speed error and speed error rate. The magnitude of marginal torque applied is based on an understanding of various efficiency modes and their capabilities. Torque may be added and removed in an efficient manner by using a tiered structure that takes advantage of current available efficiency modes (AFM, current gear, stoichiometric fueling, etc.).

In an aspect of the present disclosure, a cruise control method to control a vehicle includes: receiving, by a controller of the vehicle, a set speed, a maximum allowed speed, and a minimum allowed speed, wherein each of the maximum allowed speed and the minimum allowed speed is a speed boundary; commanding, by the controller, a propulsion system to produce a commanded axle torque to maintain the set speed; monitoring a current vehicle speed of the vehicle; determining a current vehicle acceleration of the vehicle; determining a time that the vehicle will take to reach the speed boundary as a function of the current vehicle speed and the current vehicle acceleration of the vehicle; determining whether the time that the vehicle will take to reach the speed boundary is less than a predetermined time threshold; and in response to determining that the time that the vehicle will take to reach the speed boundary is less than the predetermined time threshold, commanding, by the controller, the propulsion system of the vehicle to adjust the commanded axle torque in order to prevent the current vehicle speed from reaching the speed boundary.

Determining whether the time that the vehicle will take to reach the speed boundary is less than the predetermined time threshold includes: determining a time that the vehicle will take to reach the minimum allowed speed; and determining a time that the vehicle will take to reach the maximum allowed speed. Determining the time that the vehicle will take to reach the minimum allowed speed includes calculating the time that the vehicle will take to reach the minimum allowed speed using the following equation:

$$t_{min} = \frac{v_{min} - v}{a}$$

where:
$v$ is the current vehicle speed of the vehicle;
$a$ is the current vehicle acceleration of the vehicle;
$v_{min}$ is the minimum allowed speed; and
$t_{min}$ is the time that the vehicle will take to reach the minimum allowed speed allowed speed $v_{min}$, given the current vehicle speed and the current vehicle acceleration.

Determining the time that the vehicle will take to reach the maximum allowed speed includes calculating the time that the vehicle will take to reach the maximum allowed speed using the following equation:

$$t_{max} = \frac{v_{max} - v}{a}$$

where:
$v$ is the current vehicle speed of the vehicle;
$a$ is the current vehicle acceleration of the vehicle;
$v_{max}$ is the maximum allowed speed; and
$t_{max}$ is the time that the vehicle will take to reach the maximum allowed speed $v_{min}$, given the current vehicle speed and the current vehicle acceleration.

The cruise control method may further include: determining whether the time that the vehicle will take to reach the minimum allowed speed allowed speed is greater than zero; and in response to determining that the time that the vehicle will take to reach the minimum allowed speed allowed speed is greater than zero, commanding, by the controller, the propulsion system to increase the commanded axle torque to accelerate the vehicle.

The predetermined time threshold includes a first time array and a second time array. The first time array includes a plurality of minimum-critical time thresholds (i.e., a plurality of progressively increasing minimum critical-time thresholds). The plurality of minimum-critical time thresholds includes a first minimum-time threshold, a second minimum-time threshold, a third minimum-time threshold, and a fourth minimum-time threshold. The first minimum-time threshold is greater than the second minimum-time threshold. The second minimum-time threshold is greater than the third minimum-time threshold. The third minimum-time threshold is greater than the fourth minimum-time threshold. The second time array includes a plurality of maximum-critical time thresholds. The plurality of maximum-critical time thresholds includes a first maximum-time threshold, a second maximum-time threshold, a third maximum-time threshold, and a fourth maximum-time threshold. The first maximum-time threshold is greater than the second maximum-time threshold. The second maximum-time threshold is greater than the third maximum-time threshold. The third maximum-time threshold is greater than the fourth maximum-time threshold.

Determining whether the time that the vehicle will take to reach the speed boundary is less than the predetermined time threshold includes determining whether the time that the vehicle will take to reach the minimum allowed speed is less than the first minimum-time threshold but greater than the second minimum-time threshold. Commanding, by the controller, the propulsion system of the vehicle to adjust the commanded axle torque in order to prevent the current vehicle speed from reaching the speed boundary includes, in response to determining that the time that the vehicle will take to reach the minimum allowed speed is less than the first minimum-time threshold but greater than the second minimum-time threshold, commanding, by the controller, the propulsion system to enter a first acceleration mode;

In the first acceleration mode, the propulsion system may produce a maximum torque while remaining in an active fuel management mode. The propulsion system may include an internal combustion engine. While engaging in the active fuel management, not all of a plurality of cylinders of the internal combustion engine are active.

Determining whether the time that the vehicle will take to reach the speed boundary is less than the predetermined time threshold includes determining whether the time that the vehicle will take to reach the minimum allowed speed is less than the second minimum-time threshold but greater than the third minimum-time threshold. Commanding, by the controller, the propulsion system of the vehicle to adjust the commanded axle torque in order to prevent the current vehicle speed from reaching the speed boundary includes, in response to determining that the time that the vehicle will take to reach the minimum allowed speed is less than the second minimum-time threshold but greater than the third minimum-time threshold, commanding, by the controller, the propulsion system to enter a second acceleration mode. In the second acceleration mode, the propulsion system may disengage an active fuel management and produces a maximum torque in a current gear ratio of a transmission system of the vehicle. The propulsion system may include an internal combustion engine. While the active fuel management is disengaged, all of a plurality of cylinders of the internal combustion engine are active.

Determining whether the time that the vehicle will take to reach the speed boundary is less than the predetermined time threshold may include determining whether the time that the vehicle will take to reach the minimum allowed speed is less than or equal to the third minimum-time threshold but greater than the fourth minimum-time threshold. Commanding, by the controller, the propulsion system of the vehicle to adjust the commanded axle torque in order to prevent the current vehicle speed from reaching the speed boundary may include, in response to determining that the time that the vehicle will take to reach the minimum allowed speed is less than the third minimum-time threshold but greater than the fourth minimum-time threshold, commanding, by the controller, the propulsion system to enter a third acceleration mode. In the third acceleration mode, the propulsion system may employ closed-loop fueling for an internal combustion engine of the propulsion system. When the propulsion system employs the closed-loop fueling, an air-fuel ratio in the internal combustion engine is less than a stoichiometric air-fuel ratio. When the internal combustion engine has the stoichiometric air-fuel ratio, the internal combustion engine burns all of the fuel delivered to the internal combustion engine in the most efficient manner possible.

Determining whether the time that the vehicle will take to reach the speed boundary is less than the predetermined time threshold may include determining whether the time that the vehicle will take to reach the minimum allowed speed is less than the fourth minimum-time threshold. Commanding, by the controller, the propulsion system of the vehicle to adjust the commanded axle torque in order to prevent the current vehicle speed from reaching the speed boundary may include, in response to determining that the time that the vehicle will take to reach the minimum allowed speed is less than the fourth minimum-time threshold, commanding, by the controller, the propulsion system to enter a fourth acceleration mode. In the fourth acceleration mode, the propulsion system may produce all of a torque necessary to maintain the current vehicle speed between the minimum allowed speed and the maximum allowed speed. Determining whether the time that the vehicle will take to reach the speed boundary is less than the predetermined time threshold may include determining whether the time that the vehicle will take to reach the maximum allowed speed is less than the first maximum-time threshold but greater than the second maximum-time threshold. Commanding, by the controller, the propulsion system of the vehicle to adjust the commanded axle torque in order to prevent the current vehicle speed from reaching the speed boundary may include, in response to determining that the time that the vehicle will take to reach the maximum allowed speed is less than the first maximum-time threshold but greater than the second maximum-time threshold, commanding, by the controller, the propulsion system to enter a first deceleration mode. In the first deceleration mode, the propulsion system engages in a maximum battery regeneration. In the maximum battery regeneration, the propulsion system charges a battery of the vehicle by providing torque to the alternator. In the second deceleration mode, the propulsion system drives a compressor of an air conditioning system of the vehicle at a minimum positive engine load.

Determining whether the time that the vehicle will take to reach the speed boundary is less than the predetermined time threshold may include determining whether the time that the vehicle will take to reach the maximum allowed speed is less than the second maximum-time threshold but greater than the third maximum-time threshold. Commanding, by the controller, the propulsion system of the vehicle to adjust the commanded axle torque in order to prevent the current vehicle speed from reaching the speed boundary may include in response to determining that the time that the vehicle will take to reach the maximum allowed speed is less than the second maximum-time threshold but greater than the third maximum-time threshold, commanding, by the controller, the propulsion system to enter a second deceleration mode. In the second deceleration mode, the propulsion system does not request additional torque and enters in a deceleration fuel-cut off (DFCO) mode. In the DFCO mode, the propulsion system cuts fuel supply to an internal combustion engine of the propulsion system.

Determining whether the time that the vehicle will take to reach the speed boundary is less than the predetermined time threshold may include determining whether the time that the vehicle will take to reach the maximum allowed speed is less than the third maximum-time threshold but greater than the fourth maximum-time threshold. Commanding, by the controller, the propulsion system of the vehicle to adjust the commanded axle torque in order to prevent the current vehicle speed from reaching the speed boundary may include, in response to determining that the time that the vehicle will take to reach the maximum allowed speed is less than the third maximum-time threshold but greater than the fourth maximum-time threshold, commanding, by the controller, the vehicle to enter a third deceleration mode. In the third deceleration mode, a transmission system of the vehicle downshifts.

Determining whether the time that the vehicle will take to reach the speed boundary is less than the predetermined time threshold may include determining whether the time that the vehicle will take to reach the maximum allowed speed is less than the fourth maximum-time threshold. Commanding, by the controller, the propulsion system of the vehicle to adjust the commanded axle torque in order to prevent the current vehicle speed from reaching the speed boundary may include, in response to determining that the time that the vehicle will take to reach the maximum allowed speed is less than the fourth maximum-time threshold, commanding, by the controller, the vehicle to enter a fourth deceleration mode. In the fourth deceleration mode, a brake system of the vehicle is engaged to prevent the vehicle from reaching the maximum allowed speed.

The present disclosure also described a vehicle system including a controller programmed to execute the method described above.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

The following detailed description is merely exemplary in nature and is not intended to limit the application and uses. Furthermore, there is no intention to be bound by expressed or implied theory presented in the preceding technical field, background, brief summary or the following detailed description. As used herein, the term "module" refers to hardware, software, firmware, electronic control component, processing logic, and/or processor device, individually or in a combination thereof, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

Figure 1:
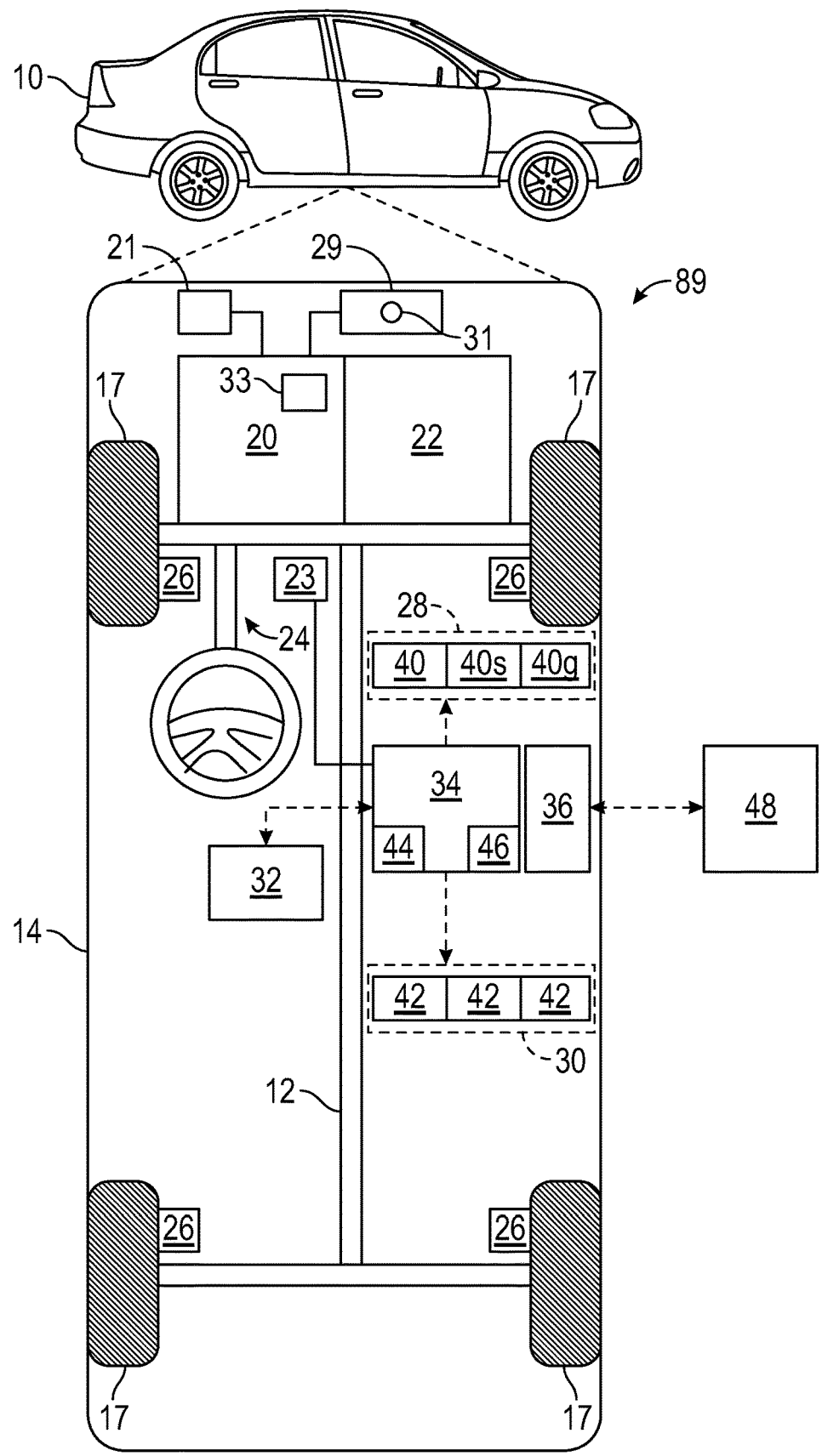
FIG. 1 is a schematic block diagram of a vehicle.

As depicted in FIG. 1, the vehicle 10 generally includes a chassis 12, a body 14, front and rear wheels 17 and may be referred to as the host vehicle. The vehicle 10 may be referred to as a motor vehicle. The body 14 is arranged on the chassis 12 and substantially encloses components of the vehicle 10. The body 14 and the chassis 12 may jointly form a frame. The wheels 17 are each rotationally coupled to the chassis 12 near a respective corner of the body 14.

In various embodiments, the vehicle 10 may be an autonomous vehicle and a control system 89 is incorporated into the vehicle 10. The control system 89 may alternatively be referred to as a vehicle system. The vehicle 10 is, for example, a vehicle that is automatically controlled to carry passengers from one location to another. The vehicle 10 is depicted in the illustrated embodiment as a passenger car, but it should be appreciated that another vehicle including motorcycles, trucks, sport utility vehicles (SUVs), recreational vehicles (RVs), marine vessels, aircraft, etc., can also be used. In an exemplary embodiment, the vehicle 10 is a so-called Level Four or Level Five automation system. A Level Four system indicates "high automation", referring to the driving mode-specific performance by an automated driving system of the aspects of the dynamic driving task, even if a human driver does not respond appropriately to a request to intervene. A Level Five system indicates "full automation", referring to the full-time performance by an automated driving system of the aspects of the dynamic driving task under different roadway and environmental conditions that can be managed by a human driver.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an electric machine such as a traction motor and/or a fuel cell propulsion system. The vehicle 10 further includes a battery (or battery pack) 21 electrically connected to the propulsion system 20. Accordingly, the battery 21 is configured to store electrical energy and to provide electrical energy to the propulsion system 20. Additionally, the propulsion system 20 may include an internal combustion engine 33 having a plurality of cylinders. When the propulsion system 20 engages active fuel management (AFM), not all of the cylinders of the internal combustion engine 33 are active. Conversely, when the propulsion system disengages AFM, all of the cylinders of the internal combustion engine 33 are active. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences a position of the vehicle wheels 17. While depicted as including a steering wheel for illustrative purposes, in some embodiments contemplated within the scope of the present disclosure, the steering system 24 may not include a steering wheel. The vehicle 10 may include an air-conditioning system 29 with a compressor 31 coupled to the internal combustion engine 33 of the propulsion system 20. The compressor 31 may be driven by the internal combustion engine.

The sensor system 28 includes one or more sensing devices 40 that sense observable conditions of the exterior environment and/or the interior environment of the vehicle 10. The sensing devices 40 may include, but are not limited to, radars, lidars, global positioning systems, optical cameras, thermal cameras, ultrasonic sensors, clocks for measuring time, and/or other sensors. The actuator system 30 includes one or more actuator devices 42 that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered). The sensing system 28 includes one or more Global Positioning System (GPS) transceiver 40g configured to detect and monitor the route data (i.e., route information). The GPS transceiver 40g is configured to communicate with a GPS to locate the position of the vehicle 10 in the globe. The GPS transceiver 40g is in electronic communication with the controller 34.

The data storage device 32 stores data for use in automatically controlling the vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer non-transitory readable storage device or media 46. The processor 44 can be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although a single controller 34 is shown in FIG. 1, embodiments of the vehicle 10 may include a number of controllers 34 that communicate over a suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the control system 89. The vehicle 10 includes a user interface 23, which may be a touchscreen in the dashboard. The user interface 23 is in electronic communication with the controller 34 and is configured to receive inputs by a user (e.g., vehicle operator). Accordingly, the controller 34 is configured to receive inputs from the user via the user interface 23. The user interface 23 includes a display configured to display information to the user (e.g., vehicle operator or passenger).

Figure 2:
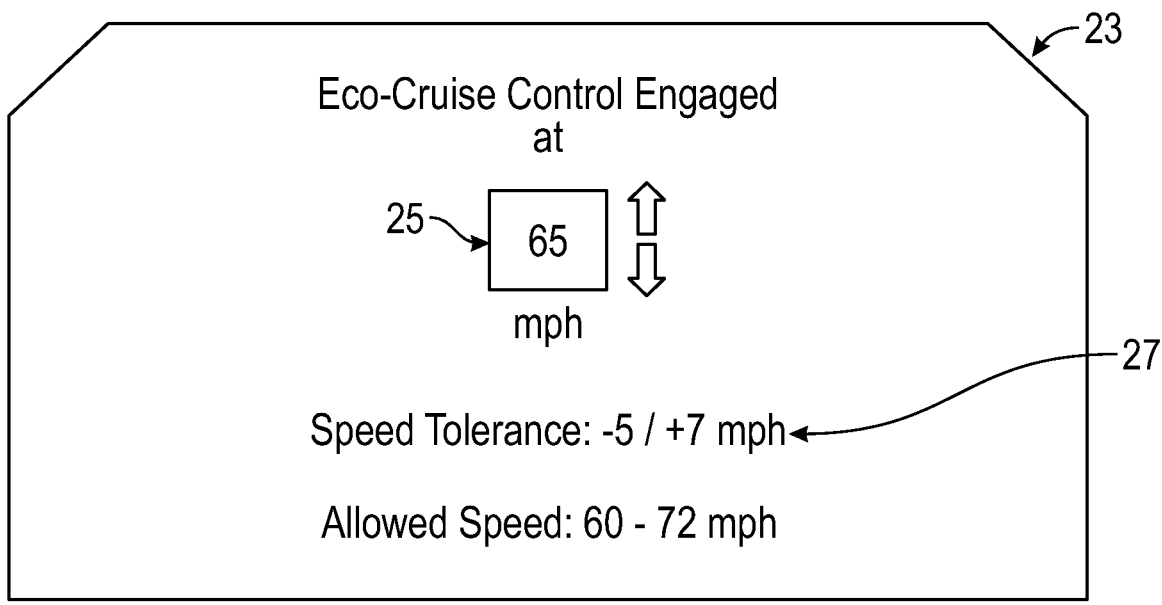
FIG. 2 is schematic diagram of part of a user interface of the vehicle of FIG. 1.

The communication system 36 is configured to wirelessly communicate information to and from other entities 48, such as but not limited to, other vehicles ("V2V" communication), infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or transceivers for receiving and/or transmitting signals, such as cooperative sensing messages (CSMs).

FIG. 1 is a schematic block diagram of the control system 89, which is configured to control the vehicle 10. The controller 34 of the control system 89 is in electronic communication with the braking system 26, the propulsion system 20, and the sensor system 28. The braking system 26 includes one or more brake actuators (e.g., brake calipers) coupled to one or more wheels 17. Upon actuation, the brake actuators apply braking pressure on one or more wheels 17 to decelerate the vehicle 10. The propulsion system 20 includes one or more propulsion actuators for controlling the propulsion of the vehicle 10. For example, as discussed above, the propulsion system 20 may include internal combustion engine 33 and, in that case, the propulsion actuator may be a throttle specially configured to control the airflow in the internal combustion engine. The sensor system 28 may include one or more accelerometers (or one or more gyroscopes) coupled to one or more wheels 17. The accelerometer is in electronic communication with the controller 34 and is configured to measure and monitor the longitudinal and lateral accelerations of the vehicle 10. The sensor system 28 may include one or more speed sensors 40s configured to measure the speed (or velocity) of the vehicle 10. The speed sensor 40s is coupled to the controller 34 and is in electronic communication with one or more wheels 17.

FIG. 2 is a schematic diagram of part of the user interface 23. The vehicle 10 has cruise control, and the driver's set speed 25 (shown in the user interface 23) can be adjusted by the driver with, for example, up/down arrows on the steering wheel of the vehicle 10. Aside from the driver's set speed 25, the user interface 23 also shows the speed tolerance 27, which includes a maximum allowed speed and a minimum allowed speed. The driver may adjust the maximum allowed speed and and/or minimum allowed of the speed tolerance using the user interface 23. The user interface 23 shows the allowed speed range, which is calculated as a function of the set speed, the maximum allowed speed, and the minimum allowed speed.

Figure 3:
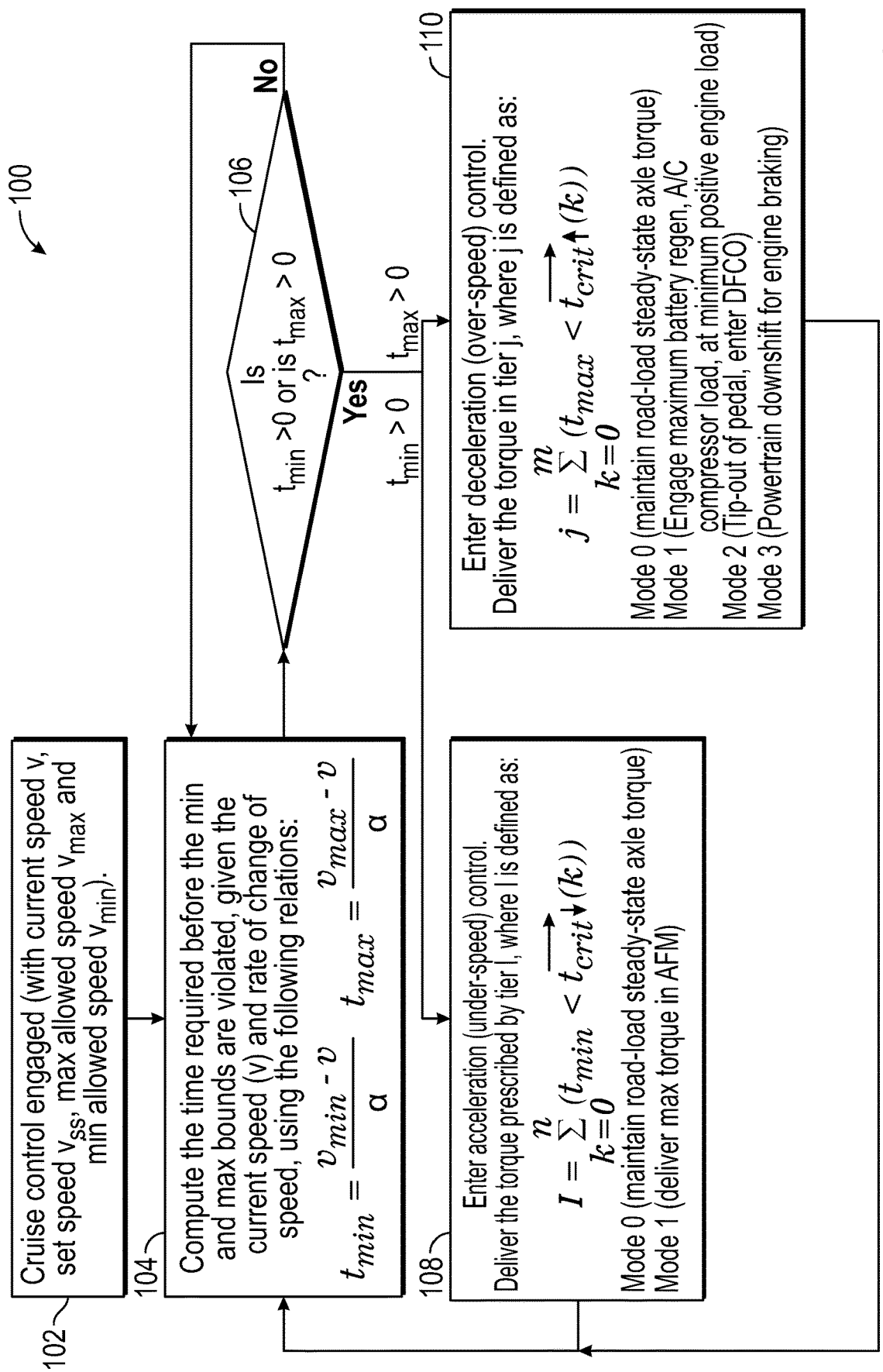
FIG. 3 is a flowchart of a method for controlling the cruise control of the vehicle to optimize fuel economy.

FIG. 3 is a flowchart of cruise control method 100 for managing torque of the vehicle 10. The method 100 begins at block 102. At block 102, the controller 34 determines that the cruise control has been engaged by the vehicle operator. The vehicle operator may engage the cruise control through the user interface 23. For instance, the vehicle operator may press a button on the user interface 23 to engage the cruise control. The vehicle operator may also set the set speed $v_{ss}$, the maximum allowed speed $v_{max}$, and the minimum allowed speed $v_{min}$ through the user interface 23 by, for example, pressing up/down arrows on the steering wheel of the vehicle 10. At block 102, the controller 34 also determines and monitors (in real time) the current vehicle speed v based on the inputs of the speed sensor 40s. At block 102, the controller 34 also determines and monitors (in real time) the acceleration of the vehicle 10 based on inputs from one or more accelerators of the sensor system 28 (or the speed sensor 40s and the clock of the sensor system 28). Then, the method 100 proceeds to block 104. At block 104, the controller 34 calculates a time that the vehicle 10 will take to reach the maximum allowed speed $v_{max}$ and/or the minimum allowed speed $v_{min}$ given the current vehicle speed v and the acceleration $\alpha$ of the vehicle 10. In other words, at block 104, the controller 34 computes the time that the vehicle 10 will take to reach a speed boundary (i.e., the maximum allowed speed $v_{max}$ and/or the minimum allowed speed $v_{min}$) as a function of the current vehicle speed v and the acceleration $\alpha$ of the vehicle 10 (i.e., the rate of change of the current vehicle speed). To do so, the controller 34 may use the following equations:

$$t_{max} = \frac{v_{max} - v}{a}$$

$$t_{min} = \frac{v_{min} - v}{a}$$

where:

v is the current vehicle speed of the vehicle 10;

$\alpha$ is the current vehicle acceleration of the vehicle 10.

$t_{min}$ is time that has to elapse before the vehicle 10 reaches the minimum allowed speed $v_{min}$, given the current speed and the current vehicle acceleration of the vehicle, and $t_{max}$ is time that has to elapse before the vehicle 10 reaches the minimum allowed speed $v_{max}$ given the current speed and current vehicle acceleration of the vehicle 10.

$t_{min}$ may also be referred to as the time that the vehicle will take to reach the minimum allowed speed $v_{min}$ given the current vehicle speed and the current vehicle acceleration. $t_{max}$ is the time that the vehicle will take to reach the maximum allowed speed $v_{min}$ given the current vehicle speed and the current vehicle acceleration.

After block 104, the method 100 proceeds to block 106. At block 106, the controller 34 determines whether the time ($t_{max}$ or $t_{min}$) that has to elapse before the vehicle 10 reaches the maximum allowed speed $v_{max}$ and the minimum allowed speed $v_{min}$, respectively, is greater than zero. If the time $t_{min}$ that has elapsed before the vehicle 10 reaches minimum allowed speed $v_{min}$ is greater than zero, then the method 100 proceeds to block 108. If the time $t_{max}$ that has elapsed before the vehicle 10 reaches maximum allowed speed $v_{max}$ is greater than zero, then the method 100 proceeds to block 110.

At block 108, the controller 34 enters the acceleration (under-speed) control and commands the propulsion system 20 to increase the commanded axle torque, thereby accelerating the vehicle 10. For example, at block 108, the controller 34 delivers the torque in modes i, where the modes i is defined as:

$$i = \sum_{k=0}^{n} \left( t_{min} < \vec{t}_{crit\downarrow}(k) \right)$$

where:

$\vec{t}_{crit\downarrow}(k)$ is an array of critical times to the minimum allowed speed that define which actions are taken by the vehicle 10 that are defined by calibration of the vehicle 10. This array has elements n, where n is the number of modes available in acceleration control. For example, the $\vec{t}_{crit\downarrow}(k)$ may read [10 seconds, 9 seconds, 4 seconds, 1 second] and may be expressed with the following equation:

$$\vec{t}_{crit\downarrow}(k) = (t_{crit\downarrow}(1), t_{crit\downarrow}(2), \ldots, t_{crit\downarrow}(n))$$

The $\vec{t}_{crit\downarrow}(k)$ array may read [10 seconds, 9 seconds, 4 seconds, 1 second] and may be referred to as the first array. Thus, the first time array includes a plurality of minimum-critical time thresholds. The plurality of minimum-critical time thresholds includes a first minimum-time threshold (e.g., 10 seconds), a second minimum-time threshold (e.g., 9 seconds), a third minimum-time threshold (e.g., 4 seconds), and a fourth minimum-time threshold (e.g., 1 second). The first minimum-time threshold is greater than the second minimum-time threshold to optimize fuel efficiency based on the modes i described below. The second minimum-time threshold is greater than the third minimum-time threshold based on the modes i described below. The third minimum-time threshold is greater than the fourth minimum-time threshold based on the modes i described below.

At block 108, the controller 34 determines which mode i should be employed by the vehicle 10 based on the time $t_{min}$ the vehicle 10 will take to reach the minimum allowed speed $v_{min}$. To do so, the controller 34 determines whether the time $t_{min}$ that the vehicle 10 will take to reach the minimum allowed speed $v_{min}$ is less than the first minimum-time threshold but greater than the second minimum-time threshold. In response to determining that the time $t_{min}$ that the vehicle 10 will take to reach the minimum allowed speed is less than the first minimum-time threshold but greater than the second minimum-time threshold, the controller 34 commands the propulsion system 20 to enter a first acceleration mode (Mode 1 in block 108). In the first acceleration mode, the propulsion system 20 produces a maximum torque while engaging in an active fuel management (AFM). While the propulsion system 20 engages in AFM, not all of a plurality of cylinders of the internal combustion engine 33 are active.

At block 108, the controller 34 determines whether the time $t_{min}$ that the vehicle 10 will take to reach the minimum allowed speed $v_{min}$ is less than the second minimum-time threshold but greater than the third minimum-time threshold. In response to determining that the time $t_{min}$ that the vehicle 10 will take to reach the minimum allowed speed $v_{min}$ is less than the second minimum-time threshold but greater than the third minimum-time threshold, the controller 34 commands the propulsion system 20 to enter a second acceleration mode. In the second acceleration mode, the propulsion system 20 disengages the AFM and produces a maximum torque in a current gear ratio of a transmission system 22 of the vehicle 10. While the AFM is disengaged, all of a plurality of cylinders of the are active. At block 108, there may be more or fewer acceleration modes, depending on the propulsion system configuration.

Further at block 108, the controller 34 determines whether the time $t_{min}$ that the vehicle 10 will take to reach the minimum allowed speed $v_{min}$ is less than the third minimum-time threshold but greater than the fourth minimum-time threshold. In response to determining that the time that the vehicle 10 will take to reach the minimum allowed speed $v_{min}$ is less than the third minimum-time threshold but greater than the fourth minimum-time threshold, the controller 34 commands the propulsion system 20 to enter a third acceleration mode. In the third acceleration mode, the propulsion system 20 employs closed-loop fueling for an internal combustion engine 33 of the propulsion system 20. When the propulsion system 20 employs the closed-loop fueling, an air-fuel ratio in the internal combustion engine 33 is less than a stoichiometric air-fuel ratio. When the internal combustion engine 33 of the propulsion system 20 has the stoichiometric air-fuel ratio, the internal combustion engine 33 burns all of the fuel delivered to the internal combustion engine. When the internal combustion engine 33 of the propulsion system 20 employs the closed-loop fueling, the internal combustion engine 33 produces more torque (in comparison when the internal combustion engine 33 is using a stoichiometric air-fuel ratio) but the fuel efficiency decreases (in comparison when the internal combustion engine 33 is using a stoichiometric air-fuel ratio).

Further, at block 108, the controller 34 determines whether the time $t_{min}$ that the vehicle 10 will take to reach the minimum allowed speed $v_{min}$ is less than the fourth minimum-time threshold. In response to determining that the time $t_{min}$ that the vehicle 10 will take to reach the minimum allowed speed $v_{min}$ is less than the fourth minimum-time threshold, the controller 34 commands the propulsion system 20 to enter a fourth acceleration mode. In the fourth acceleration mode, the propulsion system 20 produces all of the torque necessary to maintain the current vehicle speed between the minimum allowed speed $v_{min}$ and the maximum allowed speed $v_{max}$. The acceleration control also includes a default mode (Mode 0 in block 108), in which the commanded axle torque is maintained. After block 108, the method 100 returns to block 104.

As discussed above, if the time $t_{max}$ that has elapsed before the vehicle 10 reaches maximum allowed speed $v_{max}$ is greater than zero, then the method 100 proceeds to block 110. At block 110, the controller 34 enters the deceleration (over-speed) control and commands the propulsion system 20 to decrease the commanded axle torque, thereby decelerating the vehicle 10. For example, at block 110, the controller 34 delivers the torque in modes j, where the modes j is defined as:

$$j = \sum_{k=0}^{m} \left(t_{max} < \vec{t}_{crit\uparrow}(k)\right)$$

where:

$t_{crit\uparrow}\vec{}(k)$ is an array of critical times to the maximum allowed speed that define which action are taken by the vehicle 10 that are defined by calibration of the vehicle 10. This array has elements m, where n is the number of modes available in deceleration control. For example, the $t_{crit\uparrow}\vec{}(k)$ may read [10 seconds, 9 seconds, 4 seconds, 1 second] and may be expressed with the following equation:

$$t_{crit\uparrow}\vec{}(k) = (t_{crit\uparrow}(1), t_{crit\uparrow}(2), \ldots, t_{crit\uparrow}(m))$$

The $t_{crit\downarrow}\vec{}(k)$ array may read [10 seconds, 9 seconds, 4 seconds, 1 second] and may be referred to as the second array. Thus, the second time array includes a plurality of maximum-critical time thresholds (i.e., a plurality of progressively increasing maximum critical-time thresholds). The plurality of maximum-critical time thresholds includes a first maximum-time threshold (e.g., 10 seconds), a second maximum-time threshold (e.g., 9 seconds), a third maximum-time threshold (e.g., 4 seconds), and a fourth maximum-time threshold (e.g., 1 second). The first maximum-time threshold is greater than the second maximum-time threshold to optimize fuel efficiency based on the modes j described below. The second maximum-time threshold is greater than the third maximum-time threshold based on the modes j described below. The third maximum-time threshold is greater than the fourth maximum-time threshold based on the modes j described below.

At block 110, the controller 34 determines which mode i should be employed by the vehicle 10 based on the time $t_{max}$ the vehicle 10 will take to reach the maximum allowed speed $v_{max}$. To do so, the controller 34 determines whether the time $t_{max}$ that the vehicle 10 will take to reach the maximum allowed speed $v_{max}$ is less than the first maximum-time threshold but greater than the second maximum-time threshold. In response to determining that the time that the vehicle 10 will take to reach the maximum allowed speed $v_{max}$ is less than the first maximum-time threshold but greater than the second maximum-time threshold, the controller 34 commands the propulsion system to enter a first deceleration mode (Mode 1 in block 110). In the first deceleration mode, the propulsion system 20 engages in a maximum battery regeneration. In the maximum battery regeneration, the propulsion system 20 charges the battery 21 of the vehicle 10 by providing torque to the alternator. In the second deceleration mode, the propulsion system 20 drives a compressor 31 of the air conditioning system 29.

At block 110, the controller 34 determines whether the time $t_{max}$ that the vehicle 10 will take to reach the maximum allowed speed $v_{max}$ is less than the second maximum-time threshold but greater than the third maximum-time threshold. In response to determining that the time $t_{max}$ that the vehicle 10 will take to reach the maximum allowed speed $v_{max}$ is less than the second maximum-time threshold but greater than the third maximum-time threshold, the controller 34 commands the propulsion system 20 to enter a second deceleration mode (Mode 2 in block 110). In the second deceleration mode, the propulsion system 20 does not request additional torque (i.e., tip-out of the pedal) and enters in a deceleration fuel-cut off (DFCO) mode. In the DFCO mode, the propulsion system 20 cuts fuel supply to the internal combustion engine 33 of the propulsion system 20.

At block 110, the controller 34 determines whether the time $t_{max}$ that the vehicle 10 will take to reach the maximum allowed speed $v_{max}$ is less than the third maximum-time threshold but greater than the fourth maximum-time threshold. In response to determining that the time $t_{max}$ that the vehicle 10 will take to reach the maximum allowed speed $v_{max}$ is less than the third maximum-time threshold but greater than the fourth maximum-time threshold, the controller 34 commands the vehicle 10 to enter a third deceleration mode (Mode 3 in block 110). In the third deceleration mode, the transmission system 22 of the vehicle 10 downshifts for engine braking.

At block 110, the controller 34 determines whether the time $t_{max}$ that the vehicle 10 will take to reach the maximum allowed speed $v_{max}$ is less than the fourth maximum-time threshold. In response to determining that the time $t_{max}$ that the vehicle 10 will take to reach the maximum allowed speed $v_{max}$ is less than the fourth maximum-time threshold, the controller 34 commands the vehicle 10 to enter a fourth deceleration mode. In the fourth deceleration mode, the brake system 26 of the vehicle 10 is engaged to prevent the vehicle 10 from reaching the maximum allowed speed $v_{max}$. The deceleration control also includes a default mode (Mode 0 in block 110), in which the commanded axle torque is maintained. After block 110, the method 100 returns to block 104. At block 110, there may be more or fewer acceleration modes, depending on the propulsion system configuration.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A cruise control method to control a vehicle, comprising:
   receiving, by a controller of the vehicle, a set speed, a maximum allowed speed, and a minimum allowed speed, wherein each of the maximum allowed speed and the minimum allowed speed is a speed boundary, and the set speed is within the speed boundary;
   commanding, by the controller, a propulsion system to produce a commanded axle torque to maintain the set speed;
   monitoring a current vehicle speed of the vehicle;
   determining a current vehicle acceleration of the vehicle;
   determining a time that the vehicle will take to reach the speed boundary as a function of the current vehicle speed and the current vehicle acceleration of the vehicle;
   determining whether the time that the vehicle will take to reach the speed boundary is less than a predetermined time threshold; and
   in response to determining that the time that the vehicle will take to reach the speed boundary is less than the predetermined time threshold, commanding, by the controller, the propulsion system of the vehicle to adjust the commanded axle torque in order to prevent the current vehicle speed from reaching the speed boundary.

2. The cruise control method of claim 1, wherein determining whether the time that the vehicle will take to reach the speed boundary is less than the predetermined time threshold includes:
   determining a time that the vehicle will take to reach the minimum allowed speed; and
   determining a time that the vehicle will take to reach the maximum allowed speed.

3. The cruise control method of claim 2, wherein determining the time that the vehicle will take to reach the minimum allowed speed includes calculating the time that the vehicle will take to reach the minimum allowed speed using the following equation:

$$t_{min} = \frac{v_{min} - v}{a}$$

where:
   $v$ is the current vehicle speed of the vehicle;
   $\alpha$ is the current vehicle acceleration of the vehicle;
   $v_{min}$ is the minimum allowed speed; and
   $t_{min}$ is the time that the vehicle will take to reach the minimum allowed speed $v_{min}$ given the current vehicle speed and the current vehicle acceleration.

4. The cruise control method of claim 3, wherein determining the time that the vehicle will take to reach the maximum allowed speed includes calculating the time that the vehicle will take to reach the maximum allowed speed using the following equation:

$$t_{max} = \frac{v_{max} - v}{a}$$

where:
   $v$ is the current vehicle speed of the vehicle;
   $\alpha$ is the current vehicle acceleration of the vehicle;
   $v_{max}$ is the maximum allowed speed; and
   $t_{max}$ is the time that the vehicle will take to reach the maximum allowed speed $v_{max}$ given the current vehicle speed and the current vehicle acceleration.

5. The cruise control method of claim 4, further comprising:
   determining whether the time that the vehicle will take to reach the minimum allowed speed is greater than zero; and
   in response to determining that the time that the vehicle will take to reach the minimum allowed speed is greater than zero, commanding, by the controller, the propulsion system to increase the commanded axle torque to accelerate the vehicle.

6. The cruise control method of claim 5, wherein:
   the predetermined time threshold includes a first time array and a second time array;
   the first time array includes a plurality of minimum-critical time thresholds;
   the plurality of minimum-critical time thresholds includes a first minimum-time threshold, a second minimum-time threshold, a third minimum-time threshold, and a fourth minimum-time threshold;
   the first minimum-time threshold is greater than the second minimum-time threshold;
   the second minimum-time threshold is greater than the third minimum-time threshold;
   the third minimum-time threshold is greater than the fourth minimum-time threshold;
   the second time array includes a plurality of maximum-critical time thresholds; and
   the plurality of maximum-critical time thresholds includes a first maximum-time threshold, a second maximum-time threshold, a third maximum-time threshold, and a fourth maximum-time threshold;
   the first maximum-time threshold is greater than the second maximum-time threshold;
   the second maximum-time threshold is greater than the third maximum-time threshold; and
   the third maximum-time threshold is greater than the fourth maximum-time threshold.

7. The cruise control method of claim 6, wherein:
determining whether the time that the vehicle will take to reach the speed boundary is less than the predetermined time threshold includes:
   determining whether the time that the vehicle will take to reach the minimum allowed speed is less than the first minimum-time threshold but greater than the second minimum-time threshold;
commanding, by the controller, the propulsion system of the vehicle to adjust the commanded axle torque in order to prevent the current vehicle speed from reaching the speed boundary includes:
   in response to determining that the time that the vehicle will take to reach the minimum allowed speed is less than the first minimum-time threshold but greater than the second minimum-time threshold, commanding, by the controller, the propulsion system to enter a first acceleration mode;
   wherein, in the first acceleration mode, the propulsion system produces a maximum torque while engaging in an active fuel management;
   wherein the propulsion system includes an internal combustion engine; and
   wherein, while engaging in the active fuel management, not all of a plurality of cylinders of the internal combustion engine are active.

8. The cruise control method of claim 6, wherein:
determining whether the time that the vehicle will take to reach the speed boundary is less than the predetermined time threshold includes:
   determining whether the time that the vehicle will take to reach the minimum allowed speed is less than the second minimum-time threshold but greater than the third minimum-time threshold;
commanding, by the controller, the propulsion system of the vehicle to adjust the commanded axle torque in order to prevent the current vehicle speed from reaching the speed boundary includes:
   in response to determining that the time that the vehicle will take to reach the minimum allowed speed is less than the second minimum-time threshold but greater than the third minimum-time threshold, commanding, by the controller, the propulsion system to enter a second acceleration mode;
   wherein, in the second acceleration mode, the propulsion system disengages an active fuel management and produces a maximum torque in a current gear ratio of a transmission system of the vehicle;
   wherein the propulsion system includes an internal combustion engine; and
   wherein, while the active fuel management is disengaged, all of a plurality of cylinders of the internal combustion engine are active.

9. The cruise control method of claim 6, wherein:
determining whether the time that the vehicle will take to reach the speed boundary is less than the predetermined time threshold includes:
   determining whether the time that the vehicle will take to reach the minimum allowed speed is less than the third minimum-time threshold but greater than the fourth minimum-time threshold;
commanding, by the controller, the propulsion system of the vehicle to adjust the commanded axle torque in order to prevent the current vehicle speed from reaching the speed boundary includes:
   in response to determining that the time that the vehicle will take to reach the minimum allowed speed is less than the third minimum-time threshold but greater than the fourth minimum-time threshold, commanding, by the controller, the propulsion system to enter a third acceleration mode;
   wherein, in the third acceleration mode, the propulsion system employs closed-loop fueling for an internal combustion engine of the propulsion system;
   wherein, when the propulsion system employs the closed-loop fueling, an air-fuel ratio in the internal combustion engine is less than or equal to a stoichiometric air-fuel ratio; and
   wherein, when the internal combustion engine has the stoichiometric air-fuel ratio, the internal combustion engine burns all a fuel delivered to the internal combustion engine.

10. The cruise control method of claim 6, wherein:
determining whether the time that the vehicle will take to reach the speed boundary is less than the predetermined time threshold includes:
   determining whether the time that the vehicle will take to reach the minimum allowed speed is less than the fourth minimum-time threshold;
commanding, by the controller, the propulsion system of the vehicle to adjust the commanded axle torque in order to prevent the current vehicle speed from reaching the speed boundary includes:
   in response to determining that the time that the vehicle will take to reach the minimum allowed speed is less than the fourth minimum-time threshold, commanding, by the controller, the propulsion system to enter a fourth acceleration mode; and
   wherein, in the fourth acceleration mode, the propulsion system produces all of a torque necessary to maintain the current vehicle speed between the minimum allowed speed and the maximum allowed speed.

11. The cruise control method of claim 6, wherein:
determining whether the time that the vehicle will take to reach the speed boundary is less than the predetermined time threshold includes:
   determining whether the time that the vehicle will take to reach the maximum allowed speed is less than the first maximum-time threshold but greater than the second maximum-time threshold;
commanding, by the controller, the propulsion system of the vehicle to adjust the commanded axle torque in order to prevent the current vehicle speed from reaching the speed boundary includes:
   in response to determining that the time that the vehicle will take to reach the maximum allowed speed is less than the first maximum-time threshold but greater than the second maximum-time threshold, commanding, by the controller, the propulsion system to enter a first deceleration mode;
   wherein, in the first deceleration mode, the propulsion system engages in a maximum battery regeneration; and
   wherein, in the maximum battery regeneration, the propulsion system charges a battery of the vehicle; and
   wherein, in the second deceleration mode, the propulsion system drives a compressor of an air conditioning system of the vehicle.

12. The cruise control method of claim 6, wherein:
determining whether the time that the vehicle will take to reach the speed boundary is less than the predetermined time threshold includes:

determining whether the time that the vehicle will take to reach the maximum allowed speed is less than the second maximum-time threshold but greater than the third maximum-time threshold;

commanding, by the controller, the propulsion system of the vehicle to adjust the commanded axle torque in order to prevent the current vehicle speed from reaching the speed boundary includes:
  in response to determining that the time that the vehicle will take to reach the maximum allowed speed is less than the second maximum-time threshold but greater than the third maximum-time threshold, commanding, by the controller, the propulsion system to enter a second deceleration mode;
  wherein, in the second deceleration mode, the propulsion system does not request additional torque and enters in a deceleration fuel-cut off (DFCO) mode; and
  wherein, in the DFCO mode, the propulsion system cuts fuel supply to an internal combustion engine of the propulsion system.

13. The cruise control method of claim 6, wherein:
determining whether the time that the vehicle will take to reach the speed boundary is less than the predetermined time threshold includes:
  determining whether the time that the vehicle will take to reach the maximum allowed speed is less than the third maximum-time threshold but greater than the fourth maximum-time threshold;
commanding, by the controller, the propulsion system of the vehicle to adjust the commanded axle torque in order to prevent the current vehicle speed from reaching the speed boundary includes:
  in response to determining that the time that the vehicle will take to reach the maximum allowed speed is less than the third maximum-time threshold but greater than the fourth maximum-time threshold, commanding, by the controller, the vehicle to enter a third deceleration mode; and
  wherein, in the third deceleration mode, a transmission system of the vehicle downshifts.

14. The cruise control method of claim 6, wherein:
determining whether the time that the vehicle will take to reach the speed boundary is less than the predetermined time threshold includes:
  determining whether the time that the vehicle will take to reach the maximum allowed speed is less than the fourth maximum-time threshold;
commanding, by the controller, the propulsion system of the vehicle to adjust the commanded axle torque in order to prevent the current vehicle speed from reaching the speed boundary includes:
  in response to determining that the time that the vehicle will take to reach the maximum allowed speed is less than the fourth maximum-time threshold, commanding, by the controller, the vehicle to enter a fourth deceleration mode; and
  wherein, in the fourth deceleration mode, a brake system of the vehicle is engaged to prevent the vehicle from reaching the maximum allowed speed.

15. A vehicle system for a motor vehicle, comprising:
a controller programmed to:
  receive a set speed, a maximum allowed speed, and a minimum allowed speed, wherein each of the maximum allowed speed and the minimum allowed speed is a speed boundary, and the set speed is within the speed boundary;
  command, by the controller, a propulsion system to produce a commanded axle torque to maintain the set speed;
  monitor a current vehicle speed of the vehicle;
  determine a current vehicle acceleration of the vehicle;
  determine a time that the vehicle will take to reach the speed boundary as a function of the current vehicle speed and the current vehicle acceleration of the vehicle system;
  determine whether the time that the vehicle will take to reach the speed boundary is less than a predetermined time threshold; and
  in response to determining that the time that the vehicle will take to reach the speed boundary is less than the predetermined time threshold, command the propulsion system to adjust the commanded axle torque in order to prevent the current vehicle speed from reaching the speed boundary.

16. The vehicle system of claim 15, wherein the controller is programmed to:
  determine a time that the vehicle will take to reach the minimum allowed speed; and
  determine a time that the vehicle will take to reach the maximum allowed speed.

17. The vehicle system of claim 16, wherein the controller is programmed to determine the time that the vehicle will take to reach the minimum allowed speed includes calculating the time that the vehicle will take to reach the minimum allowed speed using the following equation:

$$t_{min} = \frac{v_{min} - v}{a}$$

where:
  $v$ is the current vehicle speed of the vehicle;
  $a$ is the current vehicle acceleration of the vehicle;
  $v_{min}$ is the minimum allowed speed; and
  $t_{min}$ is the time that the vehicle will take to reach the minimum allowed speed $v_{min}$ given the current vehicle speed and the current vehicle acceleration.

18. The vehicle system of claim 17, wherein the controller is programmed to determine the time that the vehicle will take to reach the maximum allowed speed includes calculating the time that the vehicle will take to reach the maximum allowed speed using the following equation:

$$t_{max} = \frac{v_{max} - v}{a}$$

where:
  $v$ is the current vehicle speed of the vehicle;
  $a$ is the current vehicle acceleration of the vehicle;
  $v_{max}$ is the minimum allowed speed; and
  $t_{max}$ is the time that the vehicle will take to reach the maximum allowed speed $v_{max}$ given the current vehicle speed and the current vehicle acceleration.

19. The vehicle system of claim 18, wherein the controller is programmed to:
  determine whether the time that the vehicle will take to reach the minimum allowed speed is greater than zero; and
  in response to determining that the time that the vehicle will take to reach the minimum allowed speed is greater than zero, command, by the controller, the propulsion system to increase the commanded axle torque to accelerate the vehicle.

20. The vehicle system of claim 19, wherein:

the predetermined time threshold includes a first time array and a second time array;

the first time array includes a plurality of minimum-critical time thresholds;

the plurality of minimum-critical time thresholds includes a first minimum-time threshold, a second minimum-time threshold, a third minimum-time threshold, and a fourth minimum-time threshold;

the first minimum-time threshold is greater than the second minimum-time threshold;

the second minimum-time threshold is greater than the third minimum-time threshold;

the third minimum-time threshold is greater than the fourth minimum-time threshold;

the second time array includes a plurality of maximum-critical time thresholds; and the plurality of maximum-critical time thresholds includes a first maximum-time threshold, a second maximum-time threshold, a third maximum-time threshold, and a fourth maximum-time threshold;

the first maximum-time threshold is greater than the second maximum-time threshold;

the second maximum-time threshold is greater than the third maximum-time threshold; and the third maximum-time threshold is greater than the fourth maximum-time threshold.

* * * * *